Nov. 19, 1940.    M. LINTZ    2,222,083
MEANS FOR HAULING BULK CEMENT
Filed April 28, 1939    2 Sheets-Sheet 1
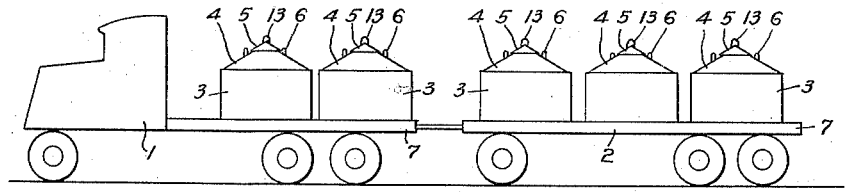
Fig. 1.
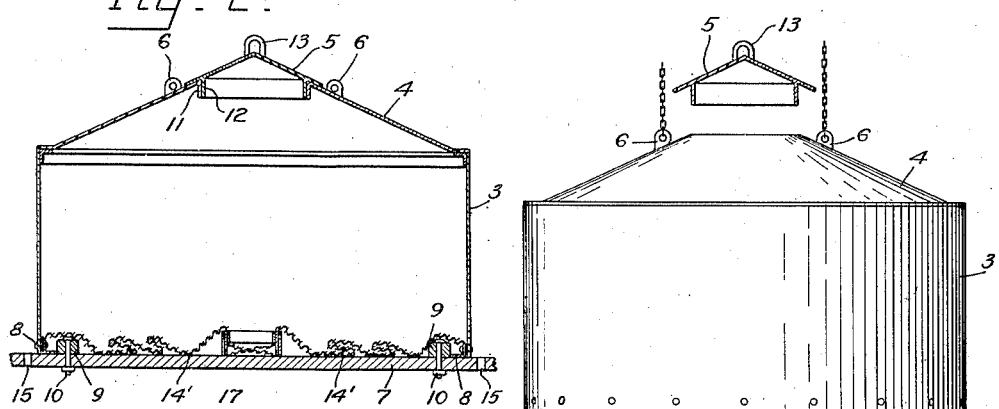
Fig. 2.
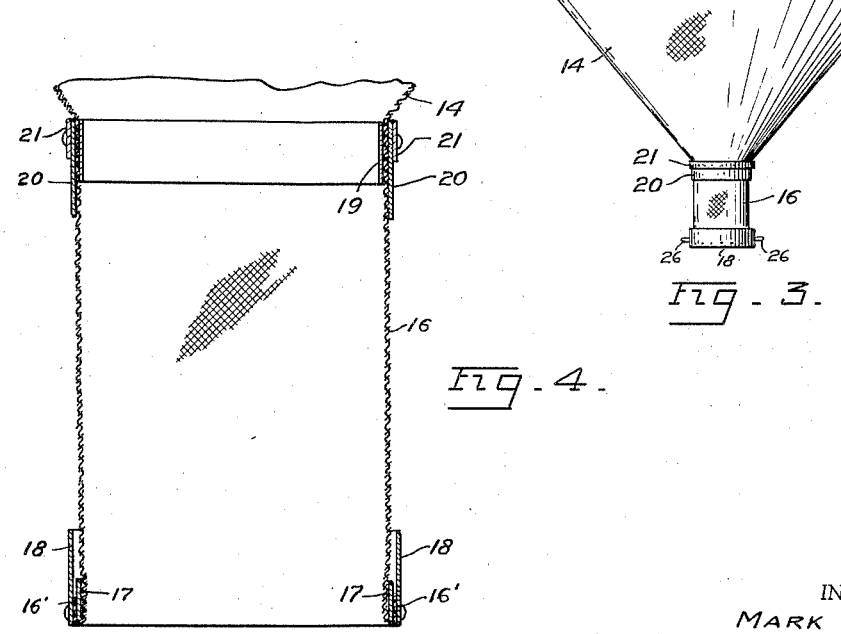
Fig. 3.
Fig. 4.
INVENTOR.
MARK LINTZ
BY J. A. Bried
ATTORNEY.

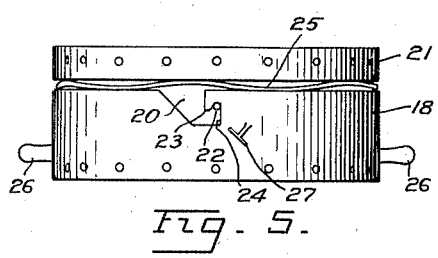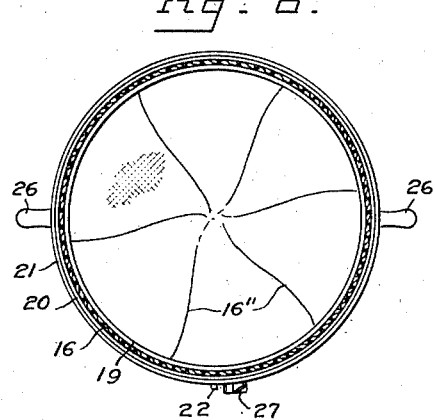

Patented Nov. 19, 1940

2,222,083

UNITED STATES PATENT OFFICE 2,222,083

MEANS FOR HAULING BULK CEMENT

Mark Lintz, San Francisco, Calif., assignor to Calaveras Cement Company, San Francisco, Calif., a corporation of Delaware Application April 28, 1939, Serial No. 270,550

5 Claims. (Cl. 214—38)

This invention relates to the transportation of cement in bulk, as from the cement plant to storage bins more or less distant from the plant, and particularly by motor trucks, though the improved means is also applicable to the bulk transportation of cement by railroad cars and boats.

The principal object of the invention is to provide an improved means for transporting cement in bulk which will obviate the use of specially constructed tank cars or permanent bins on the transporting vehicle as now in general use. A feature of the invention is the provision of special portable unit containers which serve the triple purpose of loading, transporting and dumping and thereby overcome the necessity of the usual loading and unloading equipment, bucket elevators, and special trucks etc. in common use for this purpose.

Other features and advantages of the invention will appear in the following description and accompanying drawings.

In the drawings:

Figure 1 is an elevation showing a motor truck and trailer loaded with cement carried in my special containers in accordance with the invention.

Figure 2 is a vertical central cross section of one form of my unit container with conical top and foldable canvas or fabric bottom.

Figure 3 shows the container of Figure 2 suspended on hoist chains with foldable canvas bottom extended.

Figure 4 is an enlarged vertical cross section of a flexible spout and gate as used on the container of Figures 2 and 3.

Figure 5 is a side view of the spout and gate of Figure 4 shown collapsed, part of the structure being broken away to reveal the inner arrangement.

Figure 6 is a plan view of Figure 5 showing the folded fabric when gate is closed.

Before describing the drawings in detail it may be said that in the transportation of bulk cement from the mill to various points it has heretofore been customary to load it into railroad cars built especially for the purpose, or into auto trucks constructed with special bin bodies. The loading was done either by gravity chute, bucket elevator, or by means of pneumatic conveyor, and after arriving at the point of destination the unloading was similarly carried out.

By the present improvement I avoid the use of special tank or bin type of cars or trucks and also the use of conveyors or elevators both for loading and unloading, and also materially expedite the work, by provision of a plurality of flat-bottomed, or collapsible conical bottomed, portable cement containers of relatively large capacity—say of a size to preferably hold about 8,250 pounds of cement, with the weight of the container to be around 450 pounds. The size and weight of containers is of course optional, but the above was figured for practicability of handling and size of truck platforms and legal weight limits for road trucking in California. The containers to be provided with means for readily attaching hoisting hooks or hoist slings for bodily lifting to and from the truck or car, also to be weatherproof and adapted for filling at the top and discharging at the bottom.

By the above means a quantity of the filled unit containers may be gotten ready at the mill at any convenient time, and when a shipment is to be made, two, three, or four, of the filled units are picked up one at a time by a hoist and lowered to the flat deck of a truck, railroad car, or barge, and at the destination they are similarly hoisted and swung over the mouth of a receiving bin and their contents discharged. In rough hauling the truck deck may have suitable guard strips or rails to prevent the containers from shifting due to heavy jarring while on inclined sections of the road.

The unit containers to be practicable in carrying out the method require certain features of construction, and several modifications of it are shown in the drawings.

In Figure 1 is shown a load of cement on motor truck and trailer for transportation in accordance with my method of shipping. The truck is shown at 1 and the trailer at 2, while the cement unit containers are indicated at 3, each with conical top 4 and filling cover 5, and each with hoist engaging lugs 6 adapted to receive the hooks or chains of a hoist both for loading and unloading, though in some mills the trucks with empty containers in place may be backed up or driven under gravity bins for loading in place, though it is quicker to have a lot of previously filled containers ready to swing into place the moment the empty ones are swung off.

The unit containers of Figure 1 are definitely positioned on the truck bed or deck 7 by a concealed frame or ring sill 9 bolted or otherwise secured to the deck.

The unit containers are preferably of steel and may be either square or round in plan, and in detailed construction may be as shown in Figures 2 and 3, wherein the body 3 of the container is cylindrical and it is provided with an inwardly turned angle bar 8 around its lower edge which fits easily over a positioning sill 9 of ring form bolted to the truck or trailer deck 7 as at 10. The conical roof 4 of the container has a relatively large circular filling opening downwardly flanged as at 11 and covering which is a conical cover 5 also flanged downwardly within flange 11 as at 12. Flange 11 is for the particular purpose of giving rigidity to upper end of the container adjacent the hoisting lugs 6 and distribute the strains as the contemplated load of cement in each container is over four tons. A ring 13 on the cover serves for its easy removal with the hoist.

In the design shown in Figures 2 and 3 the container has no rigid bottom, but instead is provided with a heavy foldable fabric cone shaped member 14 which, when the container is lowered to the deck of the truck folds up within the container as indicated at 14' in Figure 2 so that the lower angle bar ring 8 can come down flat on the truck as indicated.

The foldable cone 14 is preferably of heavy oiled or otherwise treated canvas and is firmly riveted at its margins to the container so as to come out above the edge of angle bar 8 and thus when the container is seated on the truck the folds of the fabric cone shaped bottom will extend inwardly over the positioning ring 9 to contact the deck within this ring only. The ring 9 is suitably sealed or calked to prevent water on the outer deck passing under it, and the adjacent deck is preferably drilled with a few drainage holes 15 to care for excess water in heavy rains.

In the center of the conical fabric bottom is a flexible fabric cylindrical neck 16 which serves both as an outlet or discharge spout as well as a closure gate when the filled container is hoisted to position on the truck. This spout-gate is shown in enlarged detail in Figures 4, 5 and 6 and wherein the lower end 16' is riveted between metal rings 17, 18, and the upper end clamped with the lower end of the conical fabric bottom 16 between rings 19 and 20 as by riveting. Ring 18 is of a width and diameter to overlap or telescope over ring 20.

When the lower ring is manually revolved it twists the fabric spout or neck 16 into closed position as shown in plan in Figure 6 at 16", and when in such condition ring 18 rises to telescope over ring 20 and come adjacent an outer ring 21 also riveted to rings 20, as shown in Figure 5 and in which view ring 18 is shown latched to ring 20 to thus lock the rings together with the flexible spout twisted closed.

To latch the upper and lower rings I preferably provide one or more pins as at 22 projecting from ring 20 and arranged to engage behind a latching lip 23 formed in a bayonet slot 24 formed in ring 18. While gravity will tend to hold ring 18 in latched position, I may supplement the action by the use of one or more springs, or a simple spring wire 25 coiled once about ring 20 and bent in waves to react between the confronting edges of rings 21 and 18. Suitable handles 26 may be secured at points about ring 18 to facilitate twisting to close the chute. Also a striking lug 27 may be welded or otherwise secured to ring 18 adjacent slot 24 so that the latched rings may be released by a blow against the lug with a hammer.

When the cement filled container unit as above described is lowered in place on the truck deck the collapsed spout will be centrally positioned in the folded fabric cone bottom 14' as indicated at 17 in Figure 2.

The general form of the unit container shown in the drawings, being of somewhat greater diameter than total height, and with a conical top insures a low center of gravity as required for road shipments and at the same time provides for structural strength necessary in repeated handling of such containers in a hoist sling.

Having thus described my invention and the manner of its use, it will be apparent to those versed in the art, that variations in detail of construction and proportions of the units may be resorted to as may fall within the spirit of the invention and scope of my appended claims. Also that while I have shown and described my method and apparatus in connection with the bulk shipment of cement, it may likewise be used for the bulk shipment of similar and other free flowing materials in bulk shipment.

I claim:

1. A portable shipping container for bulk cement or the like comprising a portable rigid tank body having a filling opening on top, a flexible fabric bottom formed to extend conically from the lower end of the tank when the tank is suspended on a hoist, and to fold up within the tank in a manner so that the lower end of the tank will not impinge upon it when the tank is placed upon a supporting surface, and a discharge gate in the outer end of the conical bottom.

2. A portable shipping container for bulk cement or the like comprising a portable rigid tank body having a filling opening on top, a flexible fabric bottom formed to extend conically from the lower end of the tank when the tank is suspended on a hoist, and to fold up within the lower end of the tank when the tank is placed upon a supporting surface, and a tubular flexible discharge gate in the outer end of the conical bottom.

3. A portable shipping container for bulk cement or the like comprising a portable rigid tank body having a filling opening on top, a flexible fabric bottom formed to extend conically from the lower end of the tank when same is suspended on a hoist, and to fold up within the lower end of the tank when the tank is placed upon a supporting surface, and a tubular flexible discharge gate in the outer end of the conical bottom arranged and adapted to be closed by twisting to collapse its opening, and means for locking it in twisted closed position.

4. In combination, a portable shipping tank for bulk materials and the deck of a shipping vehicle, said tank provided with hoist sling connections, and formed with a recessed bottom, and said deck provided with an upstanding sill formed to fit within the recessed bottom of the tank and position it on said deck, the deck around and adjacent the outer margin of said tank being lower than said sill so that any water on said deck will be below the level of said sill.

5. In combination, a portable shipping tank for bulk materials and the deck of a shipping vehicle, said tank provided with hoist sling connections, and formed with a recessed bottom, and said deck provided with an upstanding sill formed to fit within the recessed bottom of the tank and position it on said deck, the deck around and adjacent the outer margin of said tank being lower than said sill so that any water on said deck will be below the level of said sill, and water drainage holes in said deck around the outer edge of said tank.

MARK LINTZ.